Figure 1:
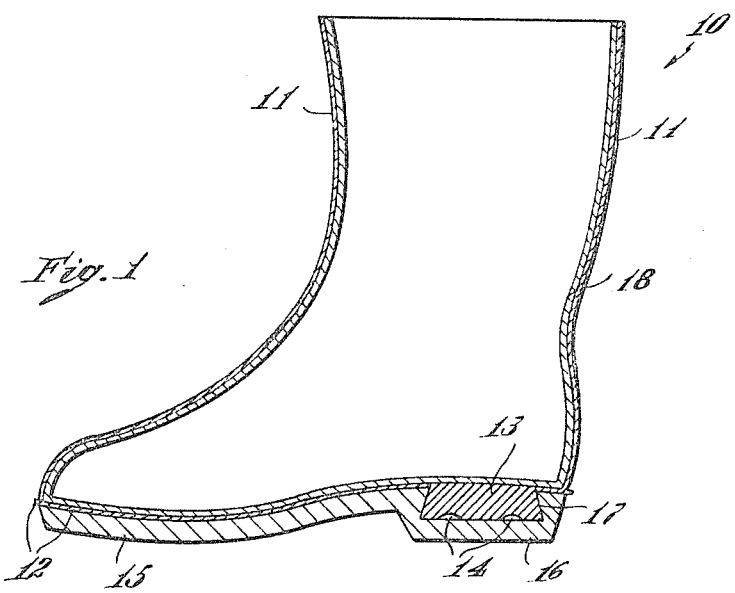

Sept. 13, 1966          H. P. LUDWIG          3,272,902

METHOD OF INJECTION MOLDING PLASTIC FOOTWEAR

Filed April 16, 1964

United States Patent Office 3,272,902
Patented Sept. 13, 1966

3,272,902
METHOD OF INJECTION MOLDING PLASTIC FOOTWEAR
Herbert P. Ludwig, Desmastr. 112,
Uesen, near Bremen, Germany
Filed Apr. 16, 1964, Ser. No. 360,290
5 Claims. (Cl. 264—244)

This invention concerns itself with a method for the injection molding of plastic footwear, especially of different color upper and heel, in an injection mold.

It is known how to injection mold plastic footwear by injecting the plastic from an injection unit into a mold. When producing footwear of one color this is done with a single injection process that molds upper and sole. One disadvantage of this method is that during cooling shrinkage occurs, especially with large heels, so that there will be places where contractions occur which reduces the quality of the shoe. Similar disadvantages also show up in production of different colored footwear if upper and sole are molded separately.

It is the purpose of this invention to eliminate these disadvantages in injection molding production of plastic footwear of both one-color and different color upper and sole.

The invention consists of the following: First during one operation the upper with a thin middle sole and a heel core is molded, then in a following operation after cooling and shrinkage have occurred, a sole is molded to the middle sole and simultaneously also coat around the heel core. Therefore, and this is important, the whole heel is not molded in a single operation but the heel is produced in two operations. First the heel core, together with the upper and thin middle sole are molded. After cooling and shrinkage have taken place, especially at heel core, a heel coat is molded around the heel core, in a second operation simultaneously with molding a sole to the middle sole. This method has the advantage that shrinkages that took place after the first operation and after cooling, especially at heel core, are filled in again during the second operation. The finished shoe therefore has no shrinkage spots (holes), i.e. it has a perfect heel and a perfect sole of uniform thickness. Another advantage is that adhesion between upper and heel turns out to be particularly good since the core of the heel was produced in one single operation with the upper, and because the core of the heel that was produced during the second operation has a larger bonding surface for attaching to the upper than if the whole heel were molded to the upper during one single operation. This invention also concerns plastic footwear where upper and sole are of plastic and produced in accordance with the aforementioned method. There the advantage and the novelty consist of the fact that upper, thin middle sole and core of heel on the one hand, and sole plus coat of heel on the other hand, are molded from different color, or else different kind of plastic. The special advantage herein is that adhesion of heel to upper is extremely good, even though different color, respectively different kind of plastic. Undesirable loosening of these parts is absolutely out of the question. This also has a very favorable bearing on the adhesion between sole and upper, because if adhesion of sole and upper is extremely good, then unwanted loosening of upper and sole, which originates in the heel, can also be avoided with certainty. For especially good adhesion of heel to upper it is of advantage if the heel is bevelled.

Figure 2:
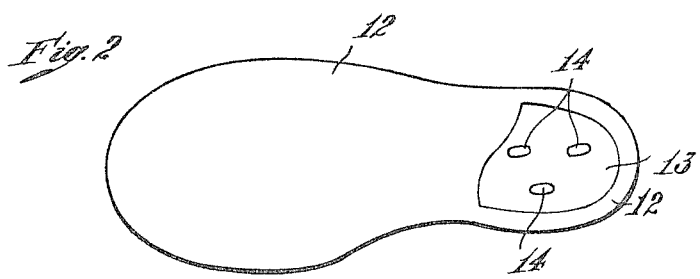

The invention will now be described in greater detail with reference to the accompanying drawing wherein:

FIG. 1 is an illustration of a two-color plastic boot that has been produced according to the technique of the invention showing the bottom part in section; and FIG. 2 is a plan view of the bottom of the boot showing the outsole and heel.

FIG. 1 shows a plastic boot 10, which has an upper 11, with thin middle sole 12, and heel core (heel filler) 13. These parts are molded with a single operation by injecting plastic into an injection mold. There then follows a period cooling for parts 11 to 13. During this period shrinkages (holes) 14 occur in heel core (heel filler) 13. During a following second operation the sole 15 with heel coat 16 is injected to upper 11, respectively injected to middle sole 12 and heel core (filler) 13. Upper 11, middle sole 12, and heel filler 13, for example, may be of red plastic whereas sole 15 and heel coat 16 may be so produced from black plastic. In the same manner, it is of course, possible to produce sole 15 and heel coat 16 not merely in different color plastic, but of different type plastic as well. Thus, for example, especially abrasion resistant plastic may be used for sole 15 and heel coat 16, and especially soft plastic compound for upper 11, thin middle sole 12 and heel core 13. It is of advantage if the heel core 13 is bevelled at 17, thus an even stronger adhesion of heel core (filler) and heel coat will be made possible.

FIG. 2 shows bottom view of shoe produced as outlined in FIG. 1, but without sole 15 and heel coat 16. Here it may be seen that middle sole 12 protrudes at sides all around from heel core 13. Heel coat 16 is molded completely around the core (filler) and is therefore extremely well attached to the core as well as the middle sole and through these parts also with the upper 11, and the bonding surface is comparatively large. Lining of upper is given #18.

It should be understood that the present disclosure is for the purpose of illustration only and that this invention includes all modifications and equivalents which fall within the scope of the appended claims.

I claim:

1. The method of making plastic footwear comprising the steps of:
    injection molding an integrated upper, midsole and heel core;
    cooling the molded article to effect shrinkage;
    positioning the molded article over an injection mold; and
    injecting a second plastic charge to cover the midsole and heel core while holding the injected plastic confined to the desired dimensions.

2. The method of making plastic footwear comprising the steps of:
    injection molding an integrated upper, midsole and heel core by injecting a charge of liquid plastic into a first mold about a rigid form of the desired shape;
    cooling the molded article to effect solidification and shrinkage;
    placing the mold article over a second injection mold; and
    injection molding an integrated outsole and heel cover to cover the insole and heel core by injecting a second charge of liquid plastic into the second mold to cover the insole and heel core while holding the injected plastic confined by said second mold to the desired dimensions.

3. A method according to claim 2, in which the heel core increases in horizontal cross-section from its junction with the midsole outwardly therefrom.

4. A method according to claim 2, in which the first plastic provides characteristics suitable for an upper and the second plastic provides an outsole and heel resistant to wear.

5. A method according to claim 2, in which the first plastic provides an upper of one color and the second plastic provides an outsole and heel of another color.

References Cited by the Examiner

UNITED STATES PATENTS

| | | | |
|---|---|---|---|
| 2,540,531 | 2/1951 | Johnston | 36—4 |
| 2,697,886 | 12/1954 | Spinali | 36—4 |
| 3,031,723 | 5/1962 | Baudou | 264—244 |
| 3,109,701 | 11/1963 | Jacquet | 264—244 |

ROBERT F. WHITE, *Primary Examiner.*

FRANK J. COHEN, *Examiner.*

T. J. CARVIS, *Assistant Examiner.*